United States Patent
Zellweger et al.

(10) Patent No.: US 10,922,128 B1
(45) Date of Patent: Feb. 16, 2021

(54) EFFICIENTLY MANAGING THE INTERRUPTION OF USER-LEVEL CRITICAL SECTIONS

(71) Applicant: VMware, Inc., Palo Alto, CA (US)

(72) Inventors: Gerd Zellweger, Palo Alto, CA (US);
Lalith Suresh, Palo Alto, CA (US);
Jayneel Gandhi, Sunnyvale, CA (US);
Amy Tai, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/721,646

(22) Filed: Dec. 19, 2019

(51) Int. Cl.
*G06F 9/54* (2006.01)
*G06F 9/48* (2006.01)

(52) U.S. Cl.
CPC .......... *G06F 9/4812* (2013.01); *G06F 9/542* (2013.01); *G06F 9/545* (2013.01); *G06F 2209/482* (2013.01)

(58) Field of Classification Search
CPC ..................................................... G06F 9/542
USPC ........................................................ 719/318
See application file for complete search history.

(56) References Cited

U.S. PATENT DOCUMENTS 8,250,331 B2 * 8/2012 Yamada .............. G06F 12/1045
711/118
8,914,620 B2 * 12/2014 Dice ..................... G06F 9/3842
712/225

OTHER PUBLICATIONS

Thomas E. Anderson et al. Scheduler Activation: Effective Kernel Support for the User-Level Management of Parallelism, ACM Transactions on Computer Systems, vol. 10, No. 1, Feb. 1992, 27 pages.

* cited by examiner

*Primary Examiner* — Andy Ho (57) ABSTRACT

Techniques for efficiently managing the interruption of user-level critical sections are provided. In certain embodiments, a physical CPU of a computer system can execute a critical section of a user-level thread of an application, where program code for the critical section is marked with CPU instruction(s) indicating that the critical section should be executed atomically. The physical CPU can detect, while executing the critical section, an event to be handled by an OS kernel of the computer system and upon detecting the event, revert changes performed within the critical section. The physical CPU can then invoke a trap handler of the OS kernel, and in response the OS kernel can invoke a user-level handler of the application with information including (1) the identity of the user-level thread, (2) an indication of the event, (3) the physical CPU state upon detecting the event, and (4) an indication that the user-level thread was interrupted while in the critical section.

21 Claims, 4 Drawing Sheets

EFFICIENTLY MANAGING THE INTERRUPTION OF USER-LEVEL CRITICAL SECTIONS

BACKGROUND

In computing, a thread (also known as a "thread of execution") is a stream or sequence of program code/instructions within a software program that is separate from, and can be executed independently of, other code/instruction streams within the program. With the proliferation of multi-core and multithreading-capable central processing units (CPUs), it is becoming increasingly common for application developers to implement multiple concurrent threads in their applications in order to exploit the parallel computing capabilities of these modern CPUs.

There are three types of threading systems in use today for managing and scheduling the execution of an application's threads: an N:1 system, a 1:1 system, and an N:M system. In an N:1 threading system, all thread operations for the application such as thread creation, scheduling, etc. are implemented at the user level (i.e., in user space) and the operating system (OS) kernel is unaware of the threads' existence. The term "N:1" refers to the fact that all (i.e., N) of the application's threads are mapped onto a single kernel entity (typically a single process).

In a 1:1 threading system, the OS kernel is aware of the thread-based concurrency within the application and the kernel itself (rather than user-level code) is responsible for carrying out most thread operations. The term "1:1" refers to the fact that each application thread is mapped onto a separate kernel entity (typically a separate kernel thread).

Finally, in an N:M threading system, the OS kernel and user-level code work in tandem to carry out thread operations, with the user-level code generally being responsible for making scheduling decisions. The term "N:M" refers to the fact that all (i.e., N) of the application's threads are mapped onto some number (i.e., M) of kernel entities, where M is greater than 1 but typically less than N. A known implementation of an N:M threading system is the "scheduler activations" system proposed by Anderson et al. in "Scheduler Activations: Effective Kernel Support for the User-Level Management of Parallelism" (ACM Transactions on Computer System, Vol. 10, No. 1, February 1992, pgs. 53-79), which is incorporated herein by reference for all purposes.

N:M threading systems address many limitations/disadvantages that are inherent in N:1 and 1:1 systems and thus represent an appealing solution, at least from a theoretical perspective, for thread management. However, N:M threading systems are also more complex than N:1 and 1:1 systems and thus can be difficult to implement in practice. Part of this complexity arises from the fact that in N:M threading systems, an application thread that is executing a critical section—in other words, a segment of program code/instructions that accesses data shared by other concurrent threads/processes and thus should be executed atomically—can be interrupted due to, e.g., a page fault, signaling of an interrupt, or some other event that causes a trap to the OS kernel. If not managed correctly, this interruption of the thread while in the critical section can result in a number of adverse consequences (depending on the nature of the code executed in the critical section), ranging from poor system performance to deadlock.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present disclosure are directed to techniques for efficiently dealing with the interruption of critical sections in user-level program code, such as in the user-level threads of an application that employs an M:N threading system. These techniques leverage "hardware transactional memory" (HTM), which is a feature provided by certain CPU architectures that enables application developers to mark, via a special set of CPU instructions, regions of application code as "HTM transactions." When a code region is marked as an HTM transaction, the instructions within that region are executed by the physical CPU hardware in an atomic manner, such that either (1) all of the instructions are executed successfully, or (2) none of the instructions are executed (which will occur if, e.g., a conflict with another concurrent thread/process is detected or if an interrupt/trap occurs in the middle of the HTM transaction). One known implementation of HTM is Intel's Transactional Synchronization Extensions (TSX), which is supported by most modern Intel CPUs.

At a high level, the techniques of the present disclosure involve marking, by an application developer, all critical sections in his/her multi-threaded application with HTM CPU instructions as noted above, thereby identifying the critical sections as HTM transactions that should be executed atomically. For example, in the case of Intel's TSX, this step comprises enclosing each critical section with "XBEGIN" and "XEND" CPU instructions as defined by the TSX specification. With these HTM CPU instructions in place, if an interrupt or trap occurs during the execution of a critical section in a user-level thread that causes the thread to be suspended, the CPU will automatically revert, in hardware, all of the memory operations performed within the critical section, per the design of the CPU's HTM feature. Stated another way, the CPU will act as if the critical section was never run. The critical section can then be re-scheduled for execution in its entirety if needed/appropriate. Thus, this approach advantageously avoids the problems that can arise when a user-level critical section is interrupted midway, with minimal changes needed on the software side (e.g., within the OS kernel or user-level code).

Figure 1:
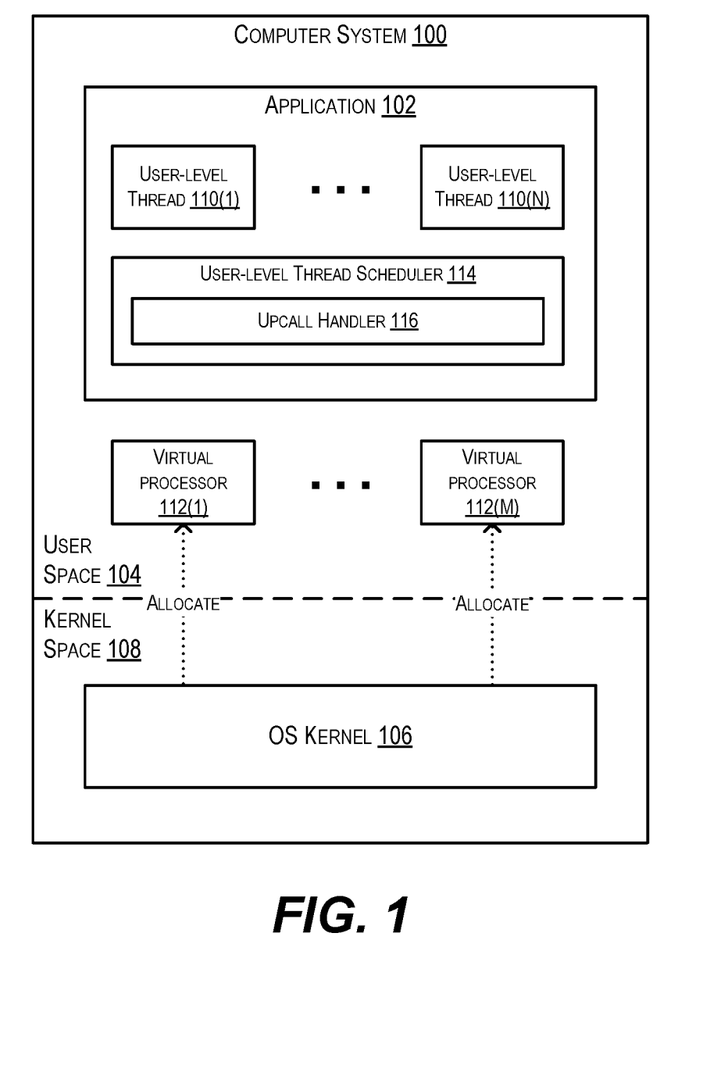
FIG. 1 depicts an example computer system according to certain embodiments.

FIG. 1 depicts an example computer system 100 in which the techniques of the present disclosure may be implemented. As shown, computer system 100 includes a software application 102 running in user space 104 and an OS kernel 106 running in kernel space 108. As known in the art, user space is the portion of computer system memory where user processes (in other words, everything other than the OS kernel) runs. In contrast, kernel space is the portion of computer system memory that is dedicated for use by, and execution of, OS kernel 106. Application 102 is a multi-threaded application and thus comprises a number of user-level threads 110(1)-(N). Each user-level thread 110 can be understood as a separate sequence of program code/instructions within application 102 that, when executed, carries out some portion of the application's functions.

As indicated previously, there are three different types of threading systems in use today for managing and scheduling the execution of user-level threads for a multi-threaded application like application 102 of FIG. 1: an N:1 threading system, a 1:1 threading system, and an N:M threading system. Computer system 100 employs an N:M threading system, which means that application 102 and OS kernel 106 work cooperatively to carry out thread operations with respect to user-level threads 110. More particularly, computer system 100 employs the "scheduler activations" N:M threading model described in the Anderson reference.

In accordance with the scheduler activations model, OS kernel 106 allocates to application 102 a number of virtual processors 112(1)-(M), which correspond to kernel entities (e.g., kernel threads or lightweight processes) that provide an execution context in which user-level threads 110(1)-(N) can run. These kernel entities are scheduled via a kernel-level scheduler (not shown) on the physical CPU(s) of computer system 100.

Upon being allocated virtual processors 112(1)-(M), application 102 decides how to schedule the execution of user-level threads 110(1)-(M) across the virtual processors via a user-level thread scheduler 114. For example, user-level thread scheduler 114 may determine that thread 110(1) should run on virtual processor 112(3), thread 110(2) should run on virtual processor 112(1), and so on. If there are more threads waiting to run than the number of virtual processors, the waiting threads will be queued in a "ready list" that is maintained by user-level thread scheduler 114 and scheduler 114 will pull threads from this ready list as virtual processors become available.

In order for user-level thread scheduler 114 to effectively manage the use of virtual processors 112(1)-(M), scheduler 114 should be informed when a user-level thread assigned to a virtual processor has blocked or is pre-empted in the kernel (due to, e.g., a page fault, signaling of a hardware interrupt, etc.). In addition, application 102 should be provided a new virtual processor in this scenario (because the virtual processor previously executing the blocked/pre-empted thread is now inactive). In various embodiments, OS kernel 106 achieves this via an "upcall" mechanism, which is a mechanism that enables OS kernel 106 to invoke/execute a function (or some other piece of code) in user space.

More particularly, when OS kernel 106 executes an upcall in the context of FIG. 1, the kernel allocates a new virtual processor 112 to application 102 and invokes a specific piece of user-level code, shown in FIG. 1 as upcall handler 116, within the execution context of the new virtual processor. As part of this invocation, OS kernel passes to upcall handler 116 information including (1) the user-level thread that was interrupted, (2) the kernel-level event that caused the interruption, and (2) the state the CPU executing the thread (e.g., register values, etc.) at the time of the interruption.

In response to being invoked, upcall handler 116 discards the execution context associated with the inactive virtual processor, places the blocked/preempted user-level thread on the ready list, and identifies a waiting thread on the ready list to execute. For example, upcall handler 116 may determine that the blocked/preempted thread should be immediately resumed. Alternatively, upcall handler 116 may choose a different waiting thread in the ready list for execution. Finally, upcall handler 116 switches over to the chosen thread, thereby causing that thread to run on the new virtual processor.

The scheduler activations model shown in FIG. 1 and described above provides a number of advantages over N:1 and 1:1 threading systems. For example, because OS kernel 106 is not involved in thread scheduling, user-level thread scheduler 114 can tailor its scheduling logic to the specific needs of application 102 and can avoid the performance overhead of communicating with OS kernel 106 for each scheduling decision, unlike 1:1 systems. At the same time, because user-level threads 110(1)-(N) are mapped to multiple (i.e., M) virtual processors/kernel entities rather than a single kernel entity, the scheduler activations model can avoid certain system integration and multiprogramming issues that are inherent in N:1 systems.

However, as noted in the Background section, a significant problem with implementing the scheduler activations model (and other similar N:M threading systems) is that it is possible for user-level threads to be interrupted while the threads are in the middle of executing critical sections. This can lead to poor performance if, e.g., other user-level threads are waiting to acquire a spinlock held by the interrupted thread within the critical section, because those other threads will not be able to make progress until the interrupted thread finishes execution of the critical section and releases the spinlock.

Alternatively, this can lead to deadlock if, e.g., the interrupted thread holds a lock on some resource and another instance of that same code is called again, which will try (but fail) to obtain another lock on that same resource. For instance, consider a scenario in which (1) upcall handler 116 is invoked due to the interruption of a user-level thread, (2) upcall handler 116 obtains a lock on the ready list in order to add and/or remove threads from the list, and (3) a page fault occurs in the handler before the lock is released. In this scenario, a second instance of upcall handler 116 will be invoked in the execution context of a new virtual processor in order to handle the interruption of the first handler instance, and that second instance will attempt to obtain a lock on the ready list. However, because the ready list is already locked by the first instance of upcall handler 116 (which is now suspended), the second instance of handler 116 cannot make progress and a deadlock occurs.

It is possible to manage the interruption of critical sections in software by, e.g., implementing code to detect when a user-level thread has been interrupted while in a critical section and to allow the thread to complete execution of the critical section before processing the trap/interrupt. But, such software-based approaches are highly complex as they generally require maintaining two different copies of each critical section in memory (a first copy that executes as normal and a second copy that relinquishes control back to the trap handler) and keeping track of multiple outstanding execution contexts/CPU states. The complexity of addressing this problem in software is one of the reasons why, despite its theoretical benefits over N:1 and 1:1 threading systems, N:M threading systems have not been widely adopted in practice.

To address the foregoing and other similar issues, embodiments of the present disclosure provide an efficient and easy-to-implement hardware-based solution for managing the interruption of critical sections in user-level threads. This hardware-based solution is based upon hardware transactional memory (HTM), which as mentioned above is a feature of modern CPU designs (such as, e.g., modern Intel CPUs) that enables application developers to mark regions of their application code as being HTM transactions, which in turn ensures that such code is executed in an atomic (i.e., all or nothing) fashion by the CPU hardware.

Figure 2:
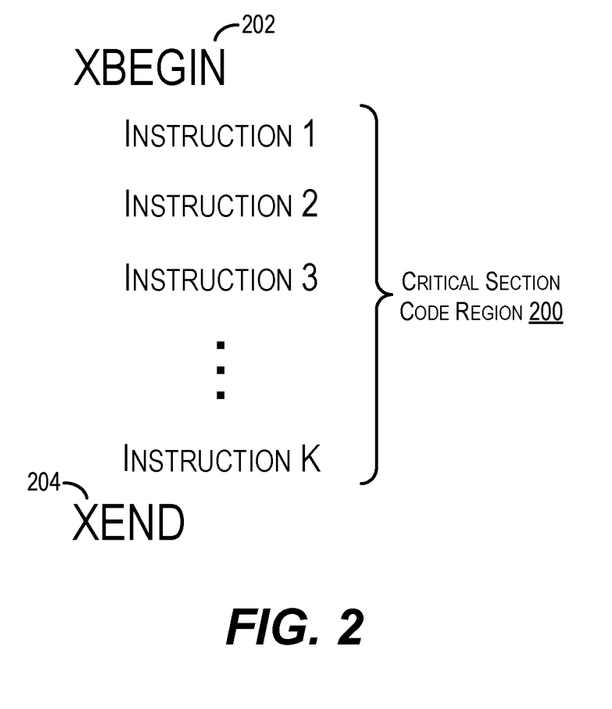
FIG. 2 depicts a critical section code region that has been wrapped in Hardware Transactional Memory (HTM) CPU instructions according to certain embodiments.

In accordance with certain embodiments, the developer of a multi-threaded application like application 102 of FIG. 1 can wrap each critical section within the application (including, e.g., upcall handler 116) with appropriate HTM CPU instructions which identify that critical section code region as an HTM transaction. For instance, FIG. 2 depicts an example code region 200 that corresponds to a critical section of application 102 that has been wrapped in this manner. As shown in FIG. 2, critical section code region 200 is enclosed by an "XBEGIN" instruction 202 at the start of the region and an "XEND" instruction 204 at the end of the region. These two CPU instructions identify critical section code region 200 as being an HTM transaction per Intel's TSX feature.

Then, if a critical section code region that is wrapped in HTM CPU instructions is executed via, e.g., a user-level thread 110 and is interrupted due to a kernel-level event, the physical CPU on which that thread is running can automatically roll-back (i.e., revert), in hardware, any changes (e.g., memory write operations) made by the critical section code in accordance with the CPU's HTM feature. In certain embodiments, the physical CPU can also re-route its current instruction pointer to point to the start of the critical section code region (e.g., the location of the)(BEGIN instruction in FIG. 2).

The physical CPU can then perform a context switch to kernel mode and execute a kernel trap handler for handling the kernel-level event, which under the scheduler activations model will cause OS kernel 106 to invoke upcall handler 116 in the context of a new virtual processor 112. Finally, upon being invoked, upcall handler 116 can take a decision on how to handle the interrupted critical section, such as rescheduling the critical section's thread for immediate resumption. Note that since the physical CPU has moved the instruction pointer for the thread's execution context to the start of the critical section, resuming that thread will cause the critical section to be executed again in its entirety.

With this HTM-based approach, managing the interruption of user-level critical sections is significantly simplified over software-based approaches because such interruptions are automatically detected and rolled-back in hardware. Thus, this HTM-based approach advantageously facilitates the implementation of N:M threading systems in general, which may help increase the practicality and adoption of such systems in the real world in comparison to N:1 and 1:1 threading systems.

Figure 3:
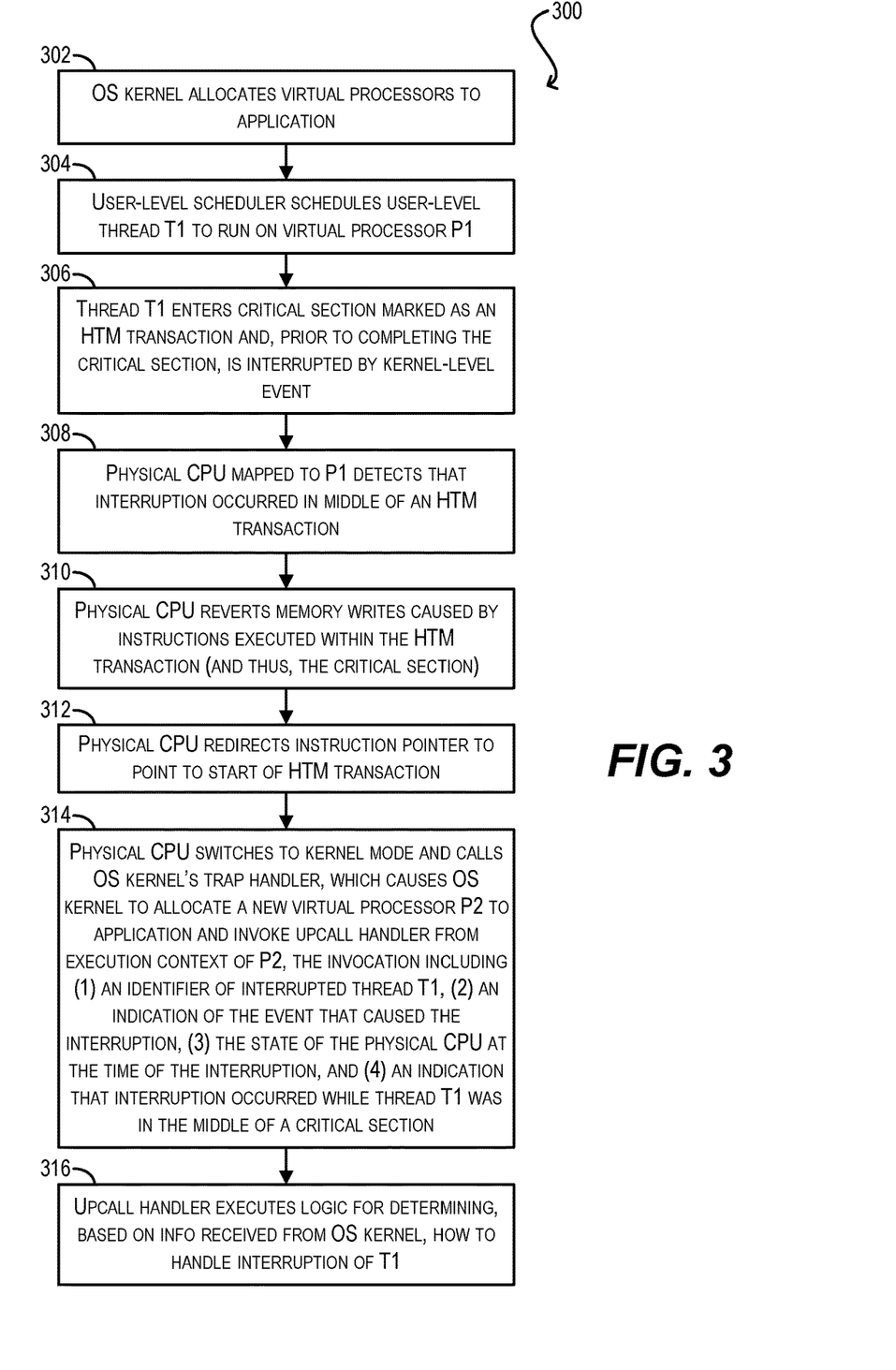
FIG. 3 depicts a first workflow for efficiently handling user-level critical sections via HTM according to certain embodiments.

FIG. 3 is flowchart 300 that details steps that may be performed by computer system 100 of FIG. 1 for handling, via HTM, the interruption of a critical section in a user-level thread of application 102 in accordance with certain embodiments. Flowchart 300 assumes that the physical CPU platform of computer system 100 supports some implementation of HTM (such, e.g., Intel's TSX) and that each critical section in application 102 has been delimited by appropriate HTM CPU instructions (e.g., XBEGIN and XEND instructions) indicating that the critical section should be treated as an HTM transaction. Flowchart 300 also assumes that application 102 and OS kernel 106 collectively implement the scheduler activations N:M threading model for managing/scheduling user-level threads 110(1)-(N) as described with respect to FIG. 1 above.

Starting with blocks 302 and 304, OS kernel 106 can allocate virtual processors 112(1)-(M) to application 102 for management by user-level thread scheduler 114 and scheduler 114 can schedule a particular user-level thread 110 (i.e., thread T1) to run on a particular virtual processor 112 (i.e., virtual processor P1).

At block 306, thread T1 can enter a critical section that is marked as an HTM transaction and, prior to completing the critical section, can be interrupted (e.g., preempted) by an event that causes the thread to be suspended. Examples of such events include a page fault, a software or hardware interrupt, etc.

In response to the event, the physical CPU of computer system 100 mapped to virtual processor P1 can detect, per its HTM functionality, that the event occurred while the CPU was in the middle of executing an HTM transaction (block 308). As a result, the physical CPU can revert any changes, such as memory writes, caused by instructions within the HTM transaction (and thus, within the critical section) (block 310). The physical CPU can also re-direct its current instruction pointer (i.e., the pointer for the instruction stream being executed by the CPU) to point to the start of the HTM transaction/critical section (block 312).

The physical CPU can subsequently switch to kernel mode and execute OS kernel 106's trap handler, which can cause OS kernel 106 to carry out the upcall mechanism described earlier. In particular, OS kernel 106 can allocate a new virtual processor P2 to application 102 and invoke upcall handler 116 from the execution context of the newly-allocated virtual processor (block 314). As part of this invocation, OS kernel 106 can pass information to upcall handler 116 that includes (1) an identifier of interrupted thread T1, (2) an indication of the event that caused the interruption, (3) the state of the physical CPU at the time of the interruption, and (4) an indication that interruption occurred while thread T1 was in the middle of a critical section.

Finally, at block 316, upcall handler 116 can execute logic for determining, based on the information received from OS kernel 106, how to handle the interruption of thread T1. For example, upcall handler 116 may decide to resume thread T1 on new virtual processor P2, in which case T1 will resume execution from the start of the critical section (in accordance with the re-directed instruction pointer). Alternatively, upcall handler 116 may decide to resume a different user-level thread from its ready list of waiting threads. Note that because all of the changes made by thread T1 in the critical section were reverted at block 310, thread T1 will not hold any locks at this point that will prevent other threads from making forward progress.

Figure 4:
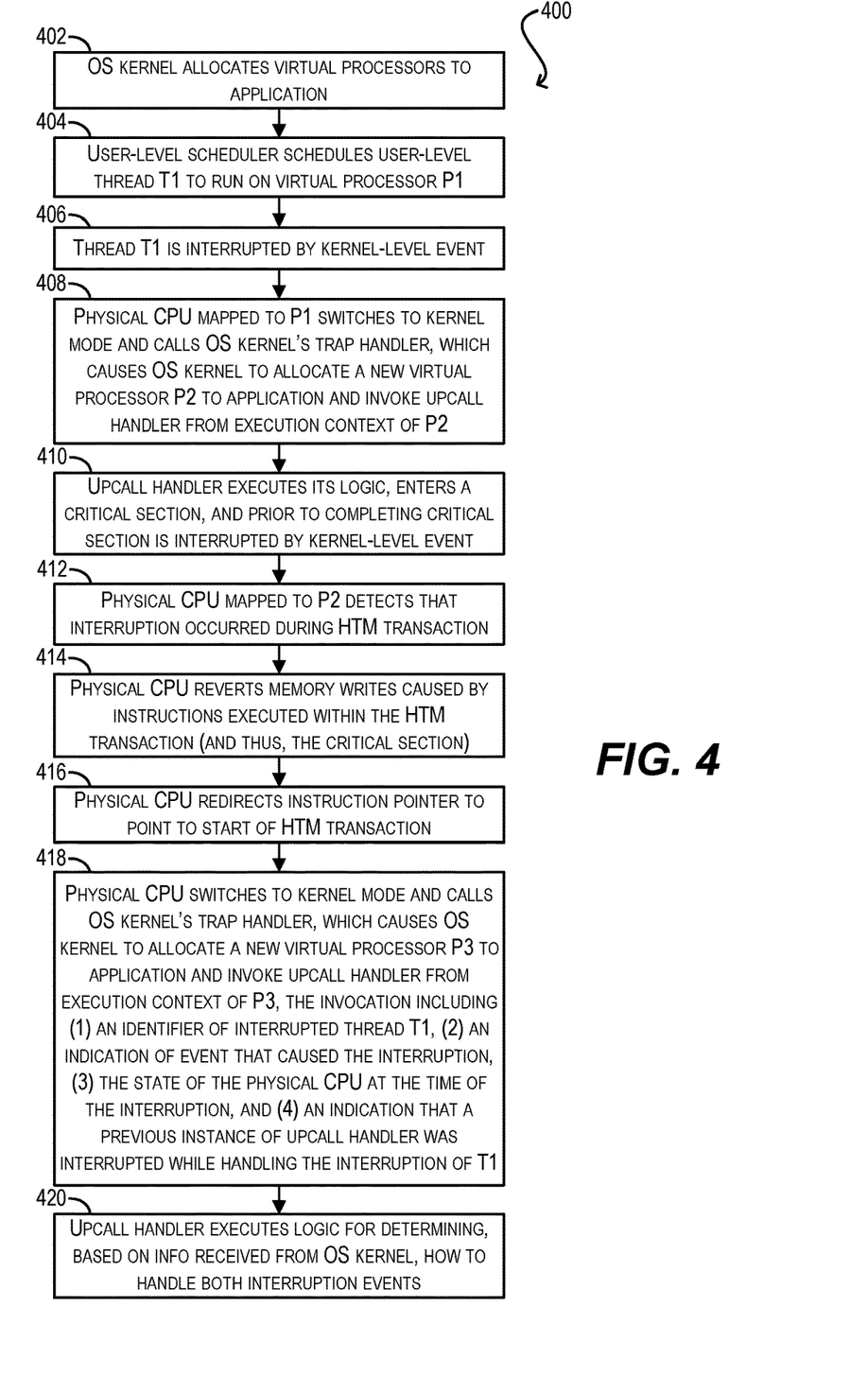
FIG. 4 depicts a second workflow for efficiently handling user-level critical sections via HTM according to certain embodiments.

FIG. 4 is a flowchart 400 that details steps that may be performed by computer system 100 of FIG. 1 for handling, via HTM, the interruption of a critical section in application 102 in accordance with certain embodiments, in the particular scenario where the critical section is within upcall handler 116. Upcall handler 116 will typically include at least one critical section code region in order to update the ready list of waiting threads in an exclusive manner. Flowchart 400 assumes that this critical section within upcall handler 116 has been delimited by HTM CPU instructions (e.g., XBEGIN and XEND instructions) per the HTM feature supported by the CPU platform of computer system 100.

Starting with blocks 402 and 404, OS kernel 106 can allocate virtual processors 112(1)-(M) to application 102 for management by user-level thread scheduler 114 and scheduler 114 can schedule a particular user-level thread 110 (i.e., thread T1) to run on a particular virtual processor 112 (i.e., virtual processor P1).

At block 406, thread T1 can begin running on P1 and, in the middle of its execution, can be interrupted by an event that causes the thread to be suspended. Examples of such events include being blocked due to an I/O request, a page fault, a software or hardware interrupt, etc.

In response to the interruption of thread T1, OS kernel 106 can allocate a new virtual processor P2 to application 102 and can invoke upcall handler 116 from the execution context of virtual processor P2 (block 408). As part of this invocation, OS kernel 106 can pass information to upcall handler 116 that includes (1) an identifier of interrupted thread T1, (2) an indication of the event that caused the interruption, and (3) the state of the physical CPU mapped to P1 at the time of the interruption.

Upon being invoked, upcall handler 116 can execute its handler logic, enter its critical section code region (which has been marked as an HTM transaction as mentioned above) and, prior to completing the critical section, can be interrupted (e.g., preempted) by an event that causes the handler to be suspended (block 410).

In response to the interruption of upcall handler 116 at block 410, the physical CPU of computer system 100 mapped to virtual processor P2 can detect, per its HTM functionality, that the event occurred while the CPU was in the middle of executing an HTM transaction (block 412). As a result, the physical CPU can revert any changes, such as memory writes, caused by instructions within the HTM transaction (and thus, within the critical section of upcall handler 116) (block 414). The physical CPU can also re-direct its current instruction pointer to point to the start of the HTM transaction/critical section (block 416).

The physical CPU can subsequently switch to kernel mode and execute OS kernel 106's trap handler, which can cause OS kernel 106 to carry out the upcall mechanism again. In particular, OS kernel 106 can allocate a new virtual processor P3 to application 102 and invoke a second instance of upcall handler 116 from the execution context of virtual processor P3 (block 418). As part of this invocation, OS kernel 106 can be aware that the interruption occurred within upcall handler 116 while handler 116 was in the process of handling the suspension of previous thread T1 and thus can pass information to the second instance of upcall handler 116 that includes (1) an identifier of interrupted thread T1, (2) an indication of the event that caused the interruption of T1, (3) the state of the physical CPU at the time of interruption of T1, and (4) an indication that a previous instance of upcall handler 116 was interrupted in the middle of a critical section, while in the process of handling the original interruption of T1.

Finally, at block 420, the second instance of upcall handler 116 running on virtual processor P3 can execute logic for determining, based on the information received from OS kernel 106 at block 418, how to handle the interruption of thread T1 and the interruption of the previous instance of handler 116. Note that in this scenario there will typically be no need to resume the previous instance of upcall handler 116, because the current (i.e., second) instance of the handler should have all of the information it needs in order to handle both interruption events.

Alternatively, in certain embodiments OS kernel 106 can simply restart/resume the previous instance of upcall handler 116 at block 418 and pass to that instance the information regarding the original interruption of thread T1 (without providing any information regarding the interruption of the upcall handler in the context of virtual processor P2). In these embodiments, the restarted upcall handler can handle the interruption of T1 without being aware that the handler itself was previously interrupted.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    executing, by a physical central processing unit (CPU) of a computer system, a first critical section of a user-level thread of an application, wherein program code for the first critical section is marked with one or more CPU instructions indicating that the first critical section should be executed in an atomic manner by the physical CPU;
    detecting, by the physical CPU while executing the first critical section, a first event to be handled by an operating system (OS) kernel of the computer system;
    upon detecting the first event, reverting, by the physical CPU, memory writes performed by the physical CPU within the first critical section;
    invoking, by the physical CPU, a trap handler of the OS kernel a first time, wherein in response to the invoking of the trap handler the first time, the OS kernel invokes a first instance of a user-level handler of the application;
    executing, by the physical CPU, a second critical section within the first instance of the user-level handler, wherein program code for the second critical section is marked with one or more CPU instructions indicating that the second critical section should be executed in an atomic manner by the physical CPU;
    detecting, by the physical CPU while executing the second critical section, a second event to be handled by the OS kernel; and
    upon detecting the second event, invoking, by the physical CPU, the trap handler a second time, wherein in response to the invoking of the trap handler the second time, the OS kernel invokes a second instance of the user-level handler and passes information to the second instance of the user-level handler including:
        an identity of the user-level thread;
        an indication of the first event;
        a state of the physical CPU upon detecting the first event; and
        an indication that the first instance of the user-level handler was interrupted in the second critical section, while handling an interruption of the user-level thread in the first critical section.

2. The method of claim 1 wherein the second instance of the user-level handler determines how to handle the user-level thread based on the information received from the OS kernel.

3. The method of claim 1 wherein the one or more CPU instructions of the first critical section are hardware transactional memory (HTM) CPU instructions which indicate to the physical CPU that the first critical section is an HTM transaction.

4. The method of claim 1 further comprising, prior to invoking the trap handler of the OS kernel the first time:
    re-directing, by the physical CPU, a current instruction pointer of the physical CPU to point to the beginning of the first critical section.

5. The method of claim 1 wherein the first critical section is marked with the one or more CPU instructions by a developer of the application.

6. The method of claim 1 wherein the application and the OS kernel employ an N:M threading system for thread management and wherein the user-level handler is an upcall handler.

7. The method of claim 1 wherein the second critical section is a code region within the user-level handler.

8. A non-transitory computer readable storage medium having stored thereon program code executable by a physical central processing unit (CPU) of a computer system, the program code embodying a method comprising:
    executing a first critical section of a user-level thread of an application, wherein program code for the first critical section is marked with one or more CPU instructions indicating that the first critical section should be executed in an atomic manner by the physical CPU;
    detecting, while executing the first critical section, a first event to be handled by an operating system (OS) kernel of the computer system;
    upon detecting the first event, reverting memory writes performed by the physical CPU within the first critical section;
    invoking a trap handler of the OS kernel a first time, wherein in response to the invoking of the trap handler the first time, the OS kernel invokes a first instance of a user-level handler of the application;
    executing a second critical section within the first instance of the user-level handler, wherein program code for the second critical section is marked with one or more CPU instructions indicating that the second critical section should be executed in an atomic manner by the physical CPU;
    detecting, while executing the second critical section, a second event to be handled by the OS kernel; and
    upon detecting the second event, invoking the trap handler a second time, wherein in response to the invoking of the trap handler the second time, the OS kernel invokes a second instance of the user-level handler and passes information to the second instance of the user-level handler including:
        an identity of the user-level thread;
        an indication of the first event;
        a state of the physical CPU upon detecting the first event; and
        an indication that the first instance of the user-level handler was interrupted in the second critical section, while handling an interruption of the user-level thread in the first critical section.

9. The non-transitory computer readable storage medium of claim 8 wherein the second instance of the user-level handler determines how to handle the user-level thread based on the information received from the OS kernel.

10. The non-transitory computer readable storage medium of claim 8 wherein the one or more CPU instructions of the first critical section are hardware transactional memory (HTM) CPU instructions which indicate to the physical CPU that the first critical section is an HTM transaction.

11. The non-transitory computer readable storage medium of claim 8 wherein the method further comprises, prior to invoking the trap handler of the OS kernel the first time:
re-directing a current instruction pointer of the physical CPU to point to the beginning of the first critical section.

12. The non-transitory computer readable storage medium of claim 8 wherein the first critical section is marked with the one or more CPU instructions by a developer of the application.

13. The non-transitory computer readable storage medium of claim 8 wherein the application and the OS kernel employ an N:M threading system for thread management and wherein the user-level handler is an upcall handler.

14. The non-transitory computer readable storage medium of claim 8 wherein the second critical section is a code region within the user-level handler.

15. A computer system comprising:
a physical central processing unit (CPU);
an operating system (OS) kernel;
an application comprising a plurality of user-level threads; and
a non-transitory computer readable medium having stored thereon code that, when executed, causes the physical CPU to:
execute a first critical section of a user-level thread of the application, wherein program code for the first critical section is marked with one or more CPU instructions indicating that the first critical section should be executed in an atomic manner by the physical CPU;
detecting, while executing the first critical section, a first event to be handled by the OS kernel;
upon detecting the first event, revert memory writes performed by the physical CPU within the first critical section; and
invoke a trap handler of the OS kernel a first time, wherein in response to the invoking of the trap handler the first time, the OS kernel invokes a first instance of a user-level handler of the application;
execute a second critical section within the first instance of the user-level handler, wherein program code for the second critical section is marked with one or more CPU instructions indicating that the second critical section should be executed in an atomic manner by the physical CPU;
detect, while executing the second critical section, a second event to be handled by the OS kernel; and
upon detecting the second event, invoke the trap handler a second time, wherein in response to the invoking of the trap handler the second time, the OS kernel invokes a second instance of the user-level handler and passes information to the second instance of the user-level handler including:
an identity of the user-level thread;
an indication of the first event;
a state of the physical CPU upon detecting the first event; and
an indication that the first instance of the user-level handler was interrupted in the second critical section, while handling an interruption of the user-level thread in the first critical section.

16. The computer system of claim 15 wherein the second instance of the user-level handler determines how to handle the user-level thread based on the information received from the OS kernel.

17. The computer system of claim 15 wherein the one or more CPU instructions of the first critical section are hardware transactional memory (HTM) CPU instructions which indicate to the physical CPU that the first critical section is an HTM transaction.

18. The computer system of claim 15 wherein the code further causes the physical CPU to, prior to invoking the trap handler of the OS kernel the first time:
re-direct a current instruction pointer of the physical CPU to point to the beginning of the first critical section.

19. The computer system of claim 15 wherein the first critical section is marked with the one or more CPU instructions by a developer of the application.

20. The computer system of claim 15 wherein the application and the OS kernel employ an N:M threading system for thread management and wherein the user-level handler is an upcall handler.

21. The computer system of claim 15 wherein the second critical section is a code region within the user-level handler.

* * * * *